US008019447B2

(12) United States Patent
Hoisington et al.

(10) Patent No.: US 8,019,447 B2
(45) Date of Patent: Sep. 13, 2011

(54) METHOD AND SYSTEM TO CONTROL OPERATION OF A DEVICE USING AN INTEGRATED SIMULATION WITH A TIME SHIFT OPTION

(75) Inventors: Zachary C. Hoisington, San Clemente, CA (US); Blaine K. Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 11/855,717

(22) Filed: Sep. 14, 2007

(65) Prior Publication Data

US 2009/0076665 A1    Mar. 19, 2009

(51) Int. Cl.
*G06F 17/19* (2011.01)
(52) U.S. Cl. .................... 700/31; 701/2; 703/2; 703/22; 717/135
(58) Field of Classification Search .............. 700/29–31; 701/2; 703/2, 7, 22; 717/135
See application file for complete search history.

(56) References Cited

U.S. PATENT DOCUMENTS

| 5,706,195 | A | 1/1998 | Corby, Jr. et al. | |
|---|---|---|---|---|
| 7,206,805 | B1 * | 4/2007 | McLaughlin, Jr. | ............. 709/203 |
| 7,640,154 | B1 * | 12/2009 | Clune et al. | ...................... 703/22 |
| 2006/0036426 | A1 * | 2/2006 | Barr et al. | ........................ 703/22 |
| 2007/0239409 | A1 * | 10/2007 | Alan | .................................. 703/2 |
| 2008/0103639 | A1 * | 5/2008 | Troy et al. | ........................ 701/2 |
| 2009/0276105 | A1 * | 11/2009 | Lacaze et al. | ...................... 701/2 |

OTHER PUBLICATIONS

Conway, Lynn, et al., "Teleautonomous Systems: Projecting and Coordinating Intelligent Action at a Distance", IEEE Transactions on Robotics and Automation, vol. 6, No. 2, pp. 146-158 (Apr. 1, 1990).
Rudzinkska, K., et al., "An Interactive System for Mobile Robot Navigation", Robot Motion and Control, 2005 Proceedings of the Fifth International Workshop on Robot Motion and Control, Dymaczewo, Poland, pp. 343-348 (Jun. 23-25, 2005).
Eurpoean Patent Office, European Search Report, dated Jun. 28, 2010.

* cited by examiner

*Primary Examiner* — Albert Decady
*Assistant Examiner* — Douglas S Lee
(74) *Attorney, Agent, or Firm* — Charles L. Moore; Moore & Van Allen PLLC

(57) ABSTRACT

A method to control a device may include forming an integrated simulation model of an actual environment in which the device is or will be operating. The integrated simulation model may be formed using pre-existing data and real-time data related to the actual environment. The method may also include presenting a simulation including a representation of the device operable in the integrated simulation model of the actual environment and allowing control of operation of the simulation of the device in the integrated simulation model of the actual environment. The method may further include controlling operation of the device in the actual environment using the simulation of the representation of the device in the integrated simulation model of the actual environment.

40 Claims, 2 Drawing Sheets

METHOD AND SYSTEM TO CONTROL OPERATION OF A DEVICE USING AN INTEGRATED SIMULATION WITH A TIME SHIFT OPTION

BACKGROUND OF THE INVENTION

The present invention relates to remote control of a device, such as an unmanned aerial system (UAS), unmanned aerial vehicle (UAV) or other vehicle or device, and more particularly to a method and system to control operation of a device using an integrated simulation with a time shift option.

One issue with remotely controlling operation of a system or device is latency. This pertains most frequently to system or devices that are at least partly controlled by a remote person or computer. Latency may be defined generally as the period of time between an operator's control input and the operator sensing a system response to the input. Latency tends to limit the rapidity with which control inputs can be made in response to sensor measurements.

Typical components of the latency may include processing the sensor signal; dwell time of the signal waiting for its spot in the data stream; signal time on route from the remote device or system's transmitter to a base station receiver; signal processing by the base station; possible display of the signal; calculation of the desired control response by the base station computer or operator; processing of this response; dwell time of the response waiting for a slot in the data stream; transmission time between base transmitter and the remote receiver; signal processing by the remote system; and control motion delay. In some systems, latency can reach levels that seriously impede system capability. For instance, in the Mars Rover, latency is on the order of about 20 minutes due to the great distance between the Rover on Mars and the base station on Earth. Control of the system by Earth-based operators must be extremely measured and slow in order to make control inputs based on accurate sensor data.

One solution for latency is to reduce latency in each part of the control system chain. However, such reductions may be limited in some situations. In the case of distant operations, the simple delay of signals due to the limited speed of light may be a constraint. Other latency components may also be difficult to eliminate or reduce.

Another solution may be to move more of the control system processing tasks onboard the device or vehicle. In this way, the vehicle is autonomous in its short-term operation and receives controls from a base station less frequently and controls that are more general in nature. However, it can be advantageous to employ human control of some types of systems, especially when the consequences of error are great or when the operating context or environment is complex and uncertain. On the one hand, moving control system processing tasks onboard could mean placing a human operator onboard or within the system. One disadvantage to this arrangement is possible exposure of the operator to potential hazards. Another disadvantage is that provisions for an onboard human operator may increase the complexity, weight and cost of the system. Alternatively, moving increasing control authority from the base station to the remote system with a non-human operator reduces the extent to which the overall system is controllable by a human. One drawback to this is that the system may "decide" to take an action that a human operator might decline to make for one reason or another.

Another possible solution for latency may be operating in a repetitive move-wait cycle. The means of controlling operation is used for some commands for unmanned space vehicles, such as the Mars Rover. Using a slow move-wait cycle may reduce the productivity of the system because the system cannot perform during the "wait" portion of the cycle. Such a method of control may also mean that the system must be designed in such a way that it is stable (if not stationary) during the wait portion of the cycle. This additional constraint on the system may impose penalties on weight, complexity or cost.

Additionally, the operation of some systems involves the potential for operator error. As used herein, "operator" may apply to a human operator, or a non-human or computer operator. For example, for some missions it may be desirable for an unmanned aerial vehicle to fly as close as possible to the ground at a high rate of speed. Such operation is sometimes referred to as "terrain following". Terrain following becomes difficult over variable or hilly terrain. The minimum altitude at which the vehicle can fly is limited in part by the vehicle's ability to accelerate vertically (up and down) via elevator control inputs. All air vehicles are limited in this regard. Another limitation on altitude is the ability of the remotely located operator or control system to judge the correct point to pull up to avoid a mountain or push down to dive into a valley. A small delay in pulling up may result in an inevitable collision with the mountain. Pushing into a valley slightly too soon may also result in a collision. Further, in ideal, calm or still conditions an optimal path may possibly be calculated in advance of an actual flight. In practice, however, there may be variations in conditions during the actual flight that cannot be foreseen or precisely predicted. These variations may include wind, differences in wind direction, turbulence, updrafts and downdrafts. Further unforeseen conditions may include new obstacles, such as towers, power lines or the other obstacles or hazards. The uncertainty in conditions may be dependent in part on the period of time between the latest measurements or observations and the actual operation or flight, the longer the period, the greater the uncertainty.

One method to reduce operator error is to operate the system with a "margin of safety" that permits the continued safe operation of the system in the event of an operator error or an unforeseen condition. In general, the margin of safety may be statistically determined to reduce errors to an acceptable level. However, a margin of safety generally imposes an operational penalty with respect to one or more measures of merit.

Another method to reduce operator error may be to replace human operators with computers. However, this may not be without its drawbacks. Generally, the software to operate complex systems autonomously is complex and expensive, especially when the system must be very reliable. Additionally, human operators are generally considered to be more flexible and resilient in the face of unforeseen circumstances and more competent to make extremely important decisions under complex circumstances.

BRIEF SUMMARY OF THE INVENTION

In accordance with an embodiment of the present invention, a method to control a device may include forming an integrated simulation model of an actual environment in which the device is or will be operating. The integrated simulation model may be formed using pre-existing data and real-time data related to the actual environment. The method may also include presenting a simulation including a representation of the actual device operable in the integrated simulation model of the actual environment and allowing control of operation of the simulation and the representation of the device in the integrated simulation model of the actual environment. The method may further include controlling operation of the actual device in the actual environment using the simulation of the device in the integrated simulation model of the actual environment.

In accordance with another embodiment of the present invention, a method to control a device may include obtaining pre-existing data related to an actual environment in which the device is or will be operating to create a simulation of the actual environment and generating a first virtual model of the actual environment based on the pre-existing data. The method may also include obtaining real-time data related to the actual environment in which the device is or will be operating and generating a second virtual model of the actual environment based on the real-time data. The method may also include merging the first virtual model and the second virtual model to form an integrated simulation model of the actual environment in which the device is or will be operating. The method may additionally include presenting a simulation including a representation of the device in the integrated simulation model of the actual environment to control operation of the simulation of the device in the integrated simulation model of the actual environment. The method may further include allowing control of operation of the simulation of the device in the integrated simulation model of the actual environment. The method may still further include creating a control script from operation of the simulation of the device in the integrated simulation model of the actual environment and transferring the control script to the device operating in the actual environment to control operation of the device in the actual environment based on the control script.

In accordance with another embodiment of the present invention, a system to control a device may include a processor to form an integrated simulation model of an actual environment in which the device is or will be operating, wherein the integrated simulation model is formed using pre-existing data and real-time data related to the actual environment. The system may also include a display to present a simulation including a representation of the device operable in the integrated simulation model of the actual environment. A control interface may be provided to allow control of operation of the simulation of the device in the integrated simulation model of the actual environment. The system may also include a transceiver to transmit a control script to the device to control operation of the device in the actual environment using the simulation of the device in the integrated simulation model of the actual environment.

In accordance with another embodiment of the present invention, a computer program product to control a device may include a computer usable medium having computer usable program code embodied therewith. The computer usable medium may include computer usable program code configured to form an integrated simulation model of an actual environment in which the device is or will be operating, wherein the integrated simulation model is formed using pre-existing data and real-time data related to the actual environment. The computer usable medium may also include computer usable program code configured to present a simulation including a representation of the device operable in the integrated simulation model of the actual environment. The computer usable medium may further include computer usable program code configured to allow control of operation of the simulation of the device in the integrated simulation model of the actual environment. The computer usable medium may yet further include computer usable program code configured to control operation of the device in the actual environment using the simulation of the device in the integrated simulation model of the actual environment.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
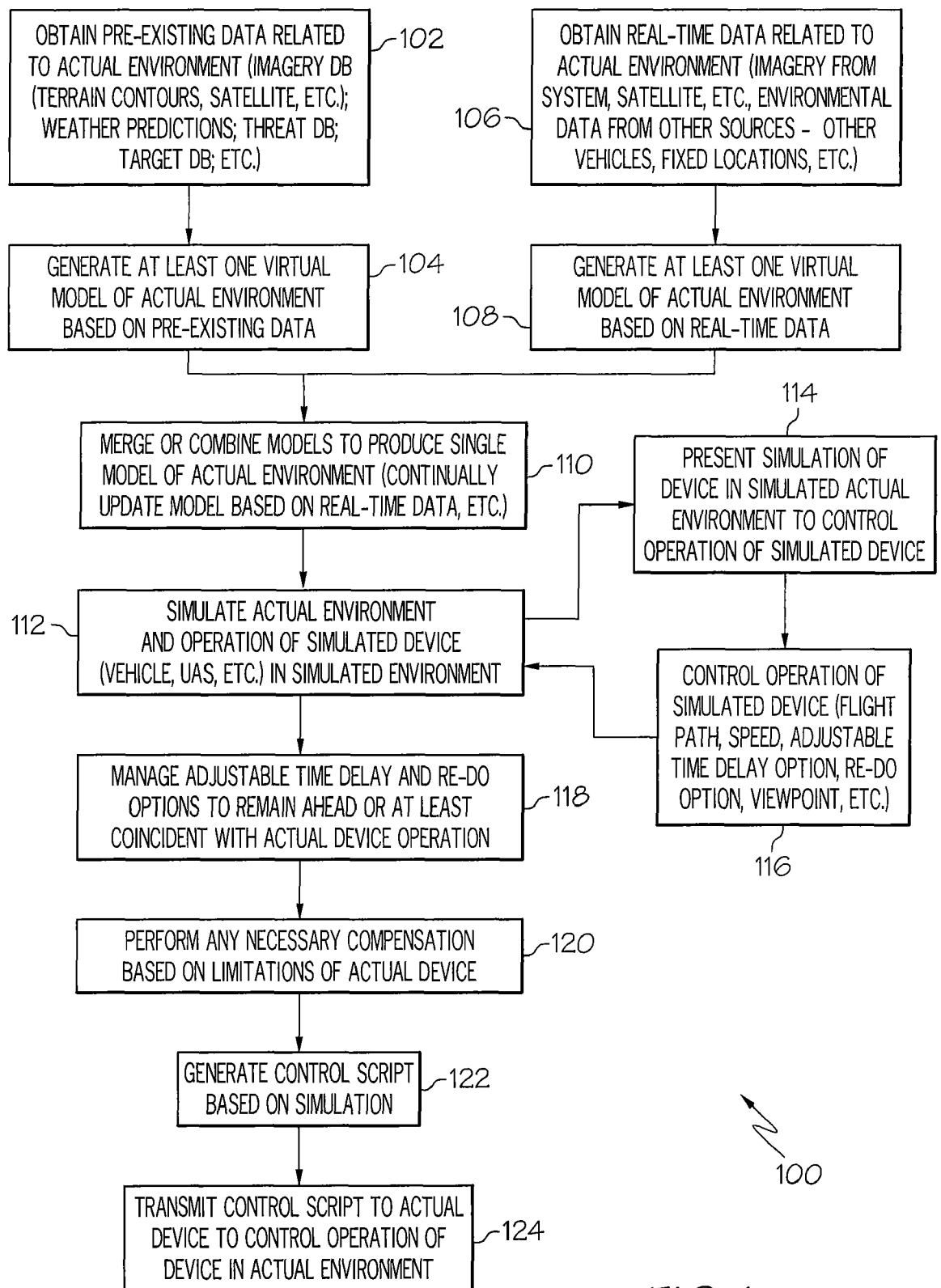
FIG. 1 is a flow chart of an exemplary method to control operation of a device using an integrated simulation with a time delay option in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, portions of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage devices; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an exemplary method 100 to control operation of a device using an integrated simulation with a time delay option in accordance with an embodiment of the present invention. The device may be an unmanned aerial system (UAS) or vehicle (UAV) or other aerospace vehicle, a terrestrial vehicle, such as the Mars Rover, Lunar Rover, other vehicle useable on Earth, a watercraft, unmanned submersible vehicle, or any type of machine, factory, machine in a factory, or system.

In block 102, pre-existing data or information related to actual mission or operating environment or context in which the device is or may be operating may be obtained. Examples of the pre-existing data may include photographs or imagery of the actual environment or context; terrain contours; weather predictions; descriptions, locations and other information related to any targets or points of interest in the environment or context; descriptions, locations and other information related to any threats or hazards for the device in the environment; or any other data related to the environment or context of operation that may be of interest. The pre-existing data may be obtained by a satellite or a satellite system, aerial and/or ground reconnaissance, fixed locations, sensors associated with any of the preceding or other means.

In block 104, at least one virtual model of the actual operating environment may be generated or formed based on the pre-existing data.

In block 106, real-time data or information related to the actual operating or mission environment or context may be obtained. Examples of the real-time data or information may also include photographs or imagery of the actual environment or context; terrain contours; weather predictions; descriptions, locations and other information related to any targets or points of interest in the environment or context; descriptions, locations and other information related to any threats or hazards for the device in the environment; or any other data related to the environment or context of operation that may be of interest. The real-time data may also be obtained by a satellite or satellite system, aerial and/or ground reconnaissance, fixed locations, sensors associated with any of the preceding, or other means.

In block 108, at least one virtual model of the actual mission environment or context may be formed or generated based in the real-time data.

In block 110, the virtual models may be merged or combined to produce or form an integrated simulation model of the actual operational environment, mission environment or context in which the device is or will be operating. Examples of software or programs that may be used to model an operational environment may include Google Earth as provided by Google of Mountain View, Calif.; Global-Scenery or X-Scenery, both provided by Laminar Research of Columbia, S.C. or similar software applications. Accurate three-dimensional computer models based on multiple photographs may be produced using software such as PhotoModeler available from EOS Systems, Inc. of Vancouver BC, Canada, or similar software or programs. Google is a trademark of Google, Inc. in the United States, other countries or both. Global-Scenery and X-Scenery are trademarks of Laminar Research in the United States, other countries or both, and PhotoModeler is a trademark of EOS System, Inc. in the United States, Canada and other countries. The integrated simulation model may be continually updated based on the real-time data or other data.

Atmospheric and/or weather conditions can also be measured or determined using various instruments and incorporated into the integrated simulation model of the actual environment. For example, motion of the atmosphere can be measured from a distance using laser-based sensors or similar sensors. Conditions in an operational environment or context may also be measured or determined using various types of electromagnetic sensors, such as radar, microwave, infrared and light sensors. Data from these sensors can be processed in numerous ways to concentrate on different kinds or types of information. For instance, a shift in frequency may be interpreted as motion by a target or other device according to the Doppler principle.

In block 112, a simulation may be generated or created including a representation of the actual device operable in the integrated simulation model of the actual environment.

In block 114, the simulation including the representation of the device operating in the simulation model of the actual environment may be presented to an operator to permit control of operation of the simulation and the representation of the actual device in the integrated simulation model of the actual environment.

In block 116, the simulation may be controlled along with operation of the simulated device in the integrated simulation model. As described in more detail herein, various features of the simulation may be controlled by an operator, such as a flight path or route of travel of the device, a speed of the device or simulation, a time delay option, a re-do option, different viewpoints from which to observe operation of the device in the simulation. The time delay option provides a predetermined time period between performing operations in the simulation and having the device in the actual environment perform the same or related operations. The time delay may be adjusted to permit more time for critical maneuvers or important aspects of the mission and more time for decision making. The simulation may be sped up during lighter workloads and to increase the time delay. The time delay may also allow for correction of any mistakes or re-doing a selected operation or function in the simulation before the actual device does the operation.

Computer based simulations of systems are quite common. For example, flight simulators are now used to train pilots. Flight simulators generally use a replica airplane cockpit with video screen views through the cockpit transparencies and actual inputs. The flight characteristics of the airplane as well as the external environment may be modeled in a computer. Simulations of real missions can be "flown" for training purposes. Lesser flight simulators are also common now, such as X-Plane by Laminar Research and Microsoft Flight Simulator to name a few. The X-Plane simulator incorporates external views and the instrument panel on a single computer screen and can be operated with a single keyboard and joystick. Simulation of many other systems is also available.

In accordance with an embodiment of the present invention, the control inputs by an operator in the simulation may be passed on to the actual device with a time delay. The time delay may be adjustable by the operator to provide an opportunity to "pause" or "rewind" the simulation. The operator may pause the simulation to consider options or to aid comprehension during a period that presents too much information. Alternatively, the operator may conclude that a mistake may have been made or that performance of a certain function may be improved. In this case the operator may "rewind" the simulation by a certain time period in order to "re-do" the operation and correct the error or improve performance. It should be noted that the rewind period must not exceed the time delay between the simulation and performance of the simulated operation of the actual device. In block 118, the adjustable time delay and re-do option may be managed to remain ahead or at least coincident with the actual device operation in the actual operational environment. A warning may be issued if the rewind option exceeds the time delay or the rewind will only be permitted to the extent of the time delay with some time margin to insure the control signals are sent before the actual device has to perform the maneuver.

A pause or rewind will reduce the time delay. If the operator wishes to restore the prior time delay, he can run the simulation at increased speed ("fast forward") until the desired delay is reached. In this case, the delay between the operator's control input and transmitting the control signals to the device must be adjusted so that time runs at constant speed for the actual device.

The optimum time delay may depend in part on how dynamic the operational environment may be. In a static environment, a long delay can be used. In an extremely dynamic environment, the time delay can be eliminated (or minimized if some latency is unavoidable). In some cases, the optimum delay will be some intermediate length of time.

An alternative to a pause or re-do for error correction may be possible. In accordance with another embodiment of the present invention, the simulated capabilities of the device may be set up to exceed the actual capabilities of the device. In other words, the simulated device may be operated with altered or enhanced performance characteristics compared to the actual device to more efficiently or effectively perform some operations or functions in the simulation. For instance, an airplane might have the capability to accelerate vertically at 10 times the force due to gravity or 10 g's. This limits, for instance, the degree to which airplane can follow the contour of hilly terrain. The simulation could, on the other hand, have the capability to pull, for example, 20 g's. In the simulated mission, the operator could fly a path attempting to limit acceleration to 10 g's. If he makes an error, he can pull harder to avoid a simulated collision with the terrain. The control software can correct the simulated flight path to permit the actual aircraft to follow the simulated flight path as closely as physically possible without exceeding operational limits of the aircraft. The degree of flight path modification possible would depend on the delay period. Accordingly, in block 120, any necessary compensation may be performed based on the operating limitations of the actual device so that the actual device can more efficiently and effectively perform the simulated operations in actuality. Alternatively, it may be advantageous in some systems to degrade the simulated capabilities of the device. Such a degradation can, for example, effectively provide a performance margin between the simulation script and the capabilities of the actual system. This increases the likelihood that the actual system can follow the script precisely, allowing for uncertain environmental or system factors that may reduce actual performance.

In block 122, a control script may be generated based on the simulation. In block 124, the control script may be transmitted to the actual device to control operation of the device in the actual environment. The control script may be continuously generated while controlling operation of the simulation of the device in the integrated simulation model of the actual environment. The control script may then be streamed to the actual device. By being streamed, the data may be sent as a substantially continuous flow of data directly to the actual device. Similar to that previously discussed, the control script may be streamed to the actual device after a predetermined time delay so that the actual device performs the function some predetermined time period after the function is performed in the simulation.

The variability of the actual device performance compared to the precise and repeatable behavior of some simulations may also be managed by an embodiment of the present invention. For instance, a pre-scripted series of control surface deflections could result in a certain flight path for an aircraft on one flight, and quite a different flight path on a subsequent flight due to small variations in atmospheric conditions or other minor variables. These variation can be addressed by controlling the desired flight path (in space and time) and permitting the aircraft's flight control system to manipulate the control surfaces to maintain that path as directed by the simulation. Deviation between the aircraft's commanded and actual path can provide the control system with information about the aircraft's capability on a particular day in a particular set of conditions. This information can also be relayed to the operator who may adjust the mission to account for the aircraft's actual capability in the actual environment.

In accordance with the embodiment of the invention as described with reference to FIG. 1, real-time data may be integrated into an existing computer model of the environment and representation the device. This permits consideration of dynamic events and conditions in operating the actual device. An optimal time delay may balance the benefit of real-time environmental and operating information with the benefit of re-doing some operations and/or modifying flight paths or other operational modifications. The adjustable time delay allows for a dynamic response to variations in environmental uncertainty. An example of this integration capability may be the integration of radar data taken from the actual device or aircraft being processed to conform to the geometry used for the simulation. This data could be filtered to show new data that is not present on the baseline geometry. For instance, the deployment of obstacles, such as barrage balloons could be detected by radar and displayed in the simulation. In this example, the actual aircraft must not be so far behind the simulation (in space) that the radar (or other sensors) can't see areas of interest to the simulation.

Another feature of the embodiment of the present invention is that the simulation can be used to reduce operator time to execute a mission compared to the actual time of the mission. In this mode, the simulation can be run at a higher speed so that the duration of the simulated mission is reduced. In the playback of the simulation to control the actual device operation, the playback is made at the correct or normal speed. Note that in this mode the actual mission may start at the same time as the simulated mission.

Alternatively, the system can be used to increase operator precision by slowing down time in the simulation so that the operator has increased time to make adjustments to the operation, thereby increasing precision or enabling more thoroughly considered decisions. In this mode, the simulation must start before the real mission at such a time that at the end of the mission the simulation is even with or ahead of the actual mission.

Figure 2:
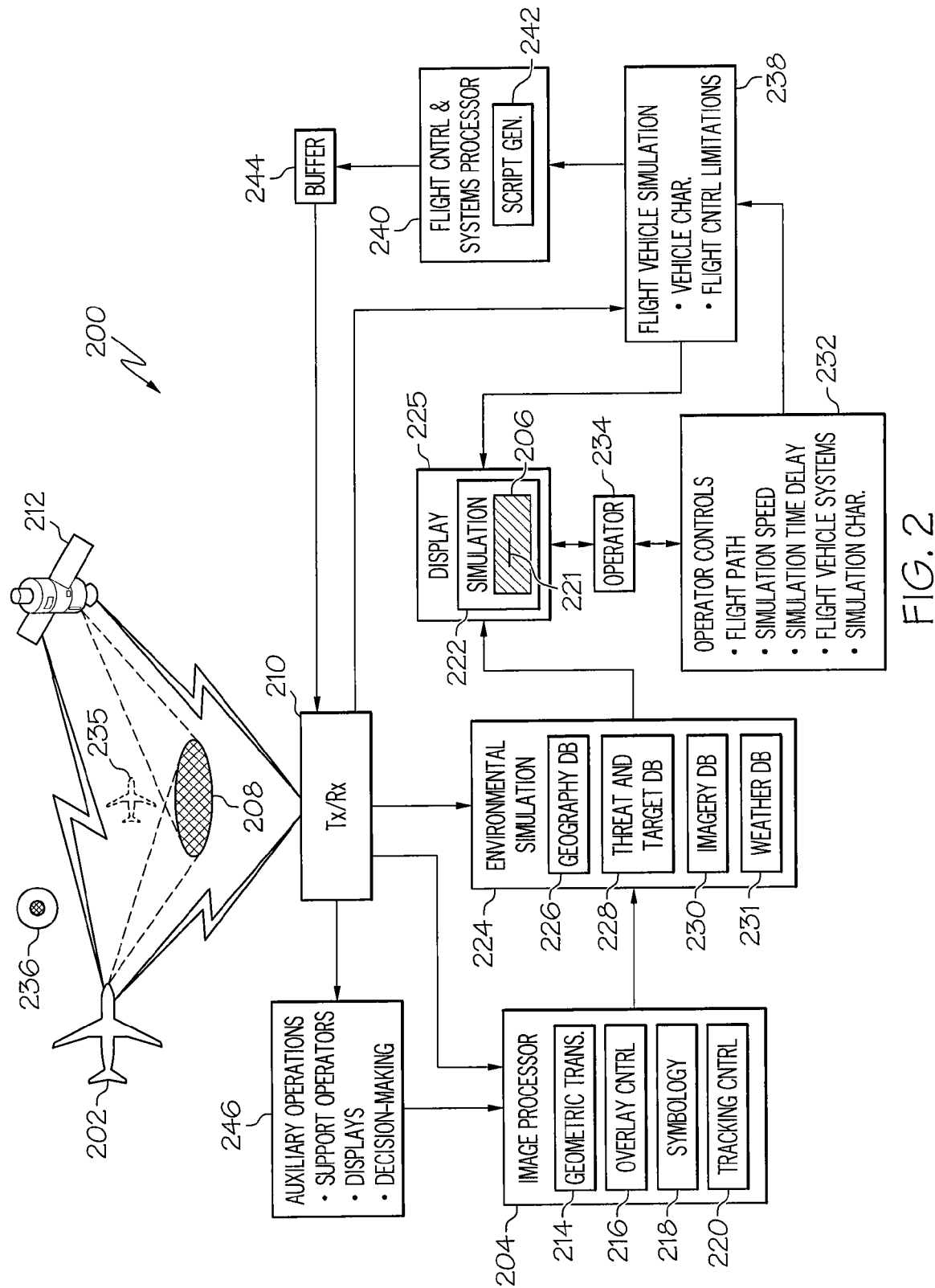
FIG. 2 is a block schematic diagram of an example of a system to control operation of a device using an integrated simulation with a time delay option in accordance with an embodiment of the present invention.

FIG. 2 is a block schematic diagram of an example of a system 200 to control operation of a device using an integrated simulation with a time delay option in accordance with an embodiment of the present invention. The method 100 may be embodied in or performed by the system 200. The device illustrated in FIG. 2 that is being controlled is an aircraft 202, such as a UAS, UAV or the like, and the embodiment of the present invention illustrated in FIG. 2 will be described with respect to controlling the operation of the airplane or aircraft 202; however, the present invention may be adapted to control any sort of vehicle, machine or system.

The system 200 may include an image processor 204 to form an integrated simulation model 206 of an actual operational environment 208 or context in which the device or aircraft 202 is or will be operating. Similar to that previously discussed, the integrated simulation environment model 206 may be formed using pre-existing data or information related to the actual environment 208 and real-time data related to the actual environment 206.

The image processor 204 may be coupled to a transceiver (Tx/Rx) 210. The transceiver 210 may receive pre-existing and/or real-time or current data related to the actual environment 208 from the actual aircraft 202 and from a satellite 212 or satellite system including multiple satellites. The transceiver 210 may also receive pre-existing and real-time data related to the environment 208 from other movable devices, such as other vehicles (airborne and terrestrial), or from fixed locations. The aircraft 202, other devices or vehicles, and fixed locations may include sensors to detect certain characteristics related to the environment as described in more detail herein, such as geographic data, threat and target information, and atmospheric and weather conditions and any other conditions or information that may be of interest or importance to the mission.

The transceiver 210 may also receive data from the aircraft 202 related to operation of the aircraft 202, such as geographic location, speed, altitude, flight path, status of vehicle systems and any other data or information that may be of interest depending upon the mission. For example the aircraft 202 may include a global positioning system (GPS) receiver that can provide latitude, longitude and altitude information that may be transmitted by the aircraft 202 to the transceiver 210 of the system 200. Another accurate positioning system that may be used may be an inertial guidance system based on three-axis acceleration plus angular information derived from gyroscopic sensors as is known and commonly used in navigation.

The image processor 204 may include a geometric transformation module 214 and an overlay control module 216. The transformation module 214 may transform the data received by the transceiver 210 for use in forming the integrated simulation model 206 of the actual environment 208. The overlay control module 216 may properly align or overlay different virtual models or images of the actual operational environment 208 generated from the pre-existing and real-time data related to the actual environment 208 to form the integrated simulation model 206 of the actual environment for presentation on a display 225.

The overlay control module 216 may perform a mapping function. Mapping of images pertains to transformation of two and three dimensional information from one shape to another. A camera is an example of one device that may be used to map images. A camera provides a viewpoint (the lens node) and an image plane (generally flat). Points in the external world are projected through the viewpoint onto the image plane. The exact results of the mapping depend on the orientation of the camera, the size of the image plane with respect to the distance from the image plane to the viewpoint (focal length) and a number of other factors. A camera can map any three dimensional array within its field of view onto its image plane.

Another form of mapping pertains to the re-shaping of images to represent the same image as seen from a different viewpoint. An example of this is seen on some roadways in which words (such as "stop") are painted in text that appears to be very elongated when seen from above but appear normal from the viewpoint of a driver. Another example is a satellite photograph of a portion of the earth's surface. This image is taken from such a high viewpoint that it is nearly a vertical projection. This image can be mapped (or distorted) to appear geometrically correct from another viewpoint. If the surface of the earth is represented non-planar and its geometry is known, the satellite image can be mapped to appear geometrically correct from any viewpoint. One example of a program to map satellite images is Google Earth program, previously discussed, that provides a three-dimensional view of the surface of the earth from any arbitrary location and angle with satellite imagery mapped to the contoured geometry of the earth.

Examples of other devices that may be used for mapping in addition to cameras may include radar, lidar, sonar, and microwave radar. Other devices, such as parabolic microphones may be capable of determining the relative angle of point sources of energy or reflection of energy.

Three dimensional (3-D) mapping is a more complex form of mapping that is also possible. Three dimensional mapping can be done in several ways. One method may use a scanning laser rangefinder. This laser rangefinder scans a field of view over a range of lateral and vertical angles with a pulsed laser. By measuring the time between the output of the pulse and its return, the device computes the distance to any external objects. The device compiles this information for a matrix of points and from this "point cloud" a three dimensional surface geometry may be computed.

Another method of three dimensional mapping uses multiple images from one or more cameras. These images may be used as an enhanced version of stereoscopic imaging to calculate an accurate geometry of an object. The geometry of common points in multiple images (from multiple viewpoints) of an object may be analyzed to determine the 3-D geometry of the object. If the viewpoint location, angle and field of view of at least one of the images are known, the location and scale of the 3-D geometry can be calculated. It is advantageous to have the multiple images taken from viewpoints that are not collinear with respect to the object or subject. It is also desirable to have the viewpoints not be coplanar where the plane intersects the object or subject. Additionally, having widely different viewpoints provides differences in views that are substantial and increases the accuracy of any computations. An example of a software application that can perform such 3-D mapping is Photosynth provided by Microsoft Live Labs. Microsoft and Photosynth are trademarks of the Microsoft Corporation of Redmond, Wash. As indicated on the Microsoft Live Labs Photosynth website, Photosynth can take a large collection of photos of a place or object and analyze them for similarities. The photos may then be displayed in a re-constructed three-dimensional space. With Photosynth, a user can virtually walk or fly through a scene to view the place or object from any angle using the photos. A photo can be seamlessly zoomed in or out.

The image processor 204 may also include a symbology module 218 and a tracking control module 220. The symbology module 218 may assign or associate predetermined symbols to represent or identify different landmarks or features in the actual environment 208 in the integrated simulation module 206. The tracking control module 220 may track any movement of the aircraft 202 in the actual environment 208 to track movement of a representation 221 of the actual aircraft 202 in the simulation 222.

An environment simulation module 224 may be associated with the image processor 204 to aid in forming the integrated simulation model 206 of the actual environment for presentation on a display 225. The environment simulation module 224 may include a geographic database 226, a threat and target database 228, an imagery database 230, and a weather database 231 or module to more accurately simulate weather conditions in the simulation 222 based on real-time data from the actual environment 208.

The geographic database 226 may store any pre-existing geographic data related to the actual environment 208. The geographic data may be obtained from surveys, photographs, terrain contour maps, or other sources similar to those previously described. The threat and target database 228 may store any pre-existing data related to potential threats or hazards to the actual aircraft 202 within the actual environment 208 for representation in the integrated simulation model 206. The threat and target database 228 may also store any pre-existing data related to targets or points of interest within the actual environment 208 for representation within the integrated simulation model 206. The imagery database 230 may store any pre-existing data corresponding to any images related to the actual environment 208. As previously discussed, images may be collected by the satellite 212, the actual aircraft 202, or other devices.

Threats and targets may be dynamic. That is, they may tend to change character and location over time. Depending on their nature, the characteristic time period may be days, hours, minutes or seconds. Additionally, the terrain or geographic database 226 and imagery database 230 on which the simulation is based may be weeks, months or years old. Accordingly, updating the simulation 222 with real-time data or at least more current data may be beneficial. Updating the data may permit avoidance of new obstacles or possible threats. In the operation of unmanned vehicles, there may be a great distance between the operator and the vehicle or device being controlled resulting in an inherent control loop lag. Updating the environmental data may enhance an operator's ability to respond to dynamic changes, such as movement of threats or targets, within the actual environment 208.

The real-time or current data may come from numerous sources and may be presented to the operator 234 in numerous ways but needs to be presented in an integrated, easily understandable way with other data, such as pre-existing data. In accordance with one embodiment of the present invention, the real-time images may be overlaid on the 3-D terrain or geographic data in the geographic database 226. This function may be performed in or controlled by the overlay control module 216. Similar to that previously described, the real-time images could come from one or more overhead satellites, reconnaissance airplanes, or ground-based cameras or sensors. Alternatively or in addition, the images could come from the actual airplane 202. These images can be mapped onto the terrain simulation as described above and then presented in the simulation from a desired viewpoint, such as viewpoint 236.

In accordance with another embodiment of the present invention, a 3-D terrain model can be created with the images wrapping the terrain in the simulation on the fly. The terrain model can be created using a 3-D terrain modeling software application, such as Photosynth, as described above, or another terrain modeling software package. The terrain can be wrapped using a process similar to Google Earth described above. The cameras to create the 3-D terrain model can be located on one or more satellites, reconnaissance airplanes or ground locations. Alternatively or additionally, a camera may be mounted to the actual airplane 202 using its motion to provide the multiple viewpoints needed to calculate the 3-D simulation model. Formation of a real-time 3-D terrain model has the advantage of identifying any new man-made structures.

Another advantage of creating real-time 3-D terrain models is that in some situations the geometry of the terrain may be completely unknown in advance. An example of this is the operation from Earth of an unmanned rover on a rocky and complex surface of a planet, such as Mars. In this case, the methods described above for the creation of 3-D models can be used to model the region around the rover. These models can then be used in the simulated operation, as described herein, and the script from the simulation can be used to operate the actual rover. An advantage of this arrangement is to avoid the exceptionally long control loop time created by the limited speed of light over the great distance between the Earth and Mars or another celestial body.

In accordance with another embodiment of the present invention, threats, targets and other features may be enhanced or otherwise highlighted or identified for easy recognition by the operator 234. These may be highlighted with the use of color, brightness, or graphic symbols. These may be presented to the operator 234 or perhaps to a support operator (block 246) as described herein on a display. Some of these features may be identified by a support operator who may control or modify the main operator's display 225.

As previously discussed the environmental simulation module 224 may include a weather database 231 or module to more accurately simulate the current actual weather or atmospheric conditions in the actual environment 208. With respect to the current or real-time weather conditions in the actual environment 208, wind speed and direction can be estimated by comparing measured airspeed and airplane heading with the airplane's ground speed and track. Airspeed and heading can be determined from the airplane's airspeeds sensor and its compass, respectively. Ground speed and track can be measured by GPS or inertial systems, similar to that previously described. This information can then be sent from the airplane 202 to the transceiver 210 for integration into the simulation 206 by the system 200.

Current or real-time turbulence levels may be measured with accelerometers or other sensors that measure linear and angular accelerations on all three axes. These values can be used to drive simulation turbulence model parameters so that the simulated airplane experiences accelerations of the same magnitude and character as the actual airplane 202. The weather module 231 may process the real-time turbulence levels to substantially simulate the effects of the turbulence in the simulation 222. The accelerometers or other sensors may be associated with the actual airplane 202, or other air or ground reconnaissance vehicles or fixed position locations.

The system 200 may also include a control interface 232 including control devices to allow an operator 234 to control operation of the simulation 222 including the representation 221 of the actual aircraft 202 in the integrated simulation model 206 of the actual environment 208. The control interface 232 may include control devices or means to control a flight path of the representation of the aircraft 202 in the integrated simulation model 206; a speed of the simulation and/or a speed of the representation 221 of the aircraft; time delay of the simulation 222; device systems or flight vehicle systems; and characteristics of the simulation of the aircraft 202. As previously described, the simulation 222 may be operated a predetermined time period before the aircraft 202 in the actual environment 208. In other words, the actual operation of the aircraft 202 may be time delayed by a predetermined time period to permit critical portions of the flight to be simulated at a slower speed for more precise maneuvering or decision making, or to permit selected operations or functions to be re-done. Accordingly, the simulation 222 may actually be operating in advance of the aircraft 202 in the actual operating environment 208 as illustrated by the phantom aircraft 235 in FIG. 2. Phantom aircraft 235 illustrates the time frame of the representation 221 of the device in the simulation 222 compared to the actual aircraft 202 in the actual environment 208.

The operator control interface 232 may also control the viewpoint 236 from which the simulation 222 is observed. Examples of different viewpoints 236 may include a viewpoint from within the representation 221 of the aircraft in the simulation 222; a viewpoint outside of the representation 221 of the aircraft, similar to viewpoint 236 in FIG. 2; and a viewpoint including the aircraft representation 221 and instrumentation associated with the aircraft 202. An example of the later viewpoint may be a simulation of a cockpit of the aircraft 202 including instrumentation that would be seen by a pilot in the aircraft 202.

The system 200 may also include a device or flight vehicle simulation module 238 to control operational characteristics of the representation 221 of the aircraft in the simulation 222 and to compensate for any operating limitations of the aircraft 202 in the actual environment 208. As previously discussed, the simulation can be substantially improved by incorporating real-time or updated data into the simulation. Accordingly, the flight vehicle simulation module 238 may receive real-time or updated data via the transceiver 210 related to operation of the actual aircraft 202 for incorporation into the simulation 222. Actual performance of the aircraft 202 may be determined in flight and relayed to the simulation 222 so key parameters of the simulation 222 can be adjusted on the fly. Using techniques, such as parameter identification as is known and used in the flight testing community, the thrust and drag characteristics of the aircraft 202 can be estimated while it is flying. These measurements can be relayed to the simulation 222 to adjust these key aircraft parameters. Other aspects of the airplane's performance may also be of interest to the pilot or simulation operator 234. These may include the status of systems including parameters such as engine temperature, revolutions per minute (RPM), system warnings (leaks, fires, etc), fuel quantity, voltage and current associated with selected systems, hydraulic pressure or other system parameters of interest.

As previously discussed, the representation 221 of the aircraft in the simulation 222 may be operated with enhanced or altered characteristics compared to the actual aircraft 202 to more efficiently or effectively perform certain operations. The enhanced or altered operation may then be compensated based of any flight or operational limitations of the actual aircraft 202.

The system 200 may further include a device or flight control and systems processor 240. A control script generator 242 may be embodied in the flight control and systems processor 240 to generate a control script based on the simulation for controlling the aircraft 202 in the actual environment 208 similar to that previously described.

A buffer 244 may be provided to buffer the control script before being transmitted to the aircraft 202. Because the simulation 222 may be performed in advance of the actual mission or operation of the aircraft 202 and the control script may be buffered to transmit the control script from the transceiver 210 to the aircraft 202 within the appropriate time frame, latency in the system 200 may be substantially reduced or eliminated, as well as operator error.

The system 200 may also include an auxiliary operations module 246. The auxiliary operations module 246 or feature may involve support operations to assist in decision making and controlling operation of the simulation 222 similar to that previously described.

As described above, a control script may be generated from the simulation 222 and the control script may be used to operate or fly the aircraft 202. The control script may define spatial coordinates and angular values as a function of time to define a location and flight path of the aircraft 202. Time may be broken into small increments, for example $\frac{1}{10}$ second and for each increment the spatial coordinates and angular values may be specified. (Note that it could be that some values are provided (or updated) more frequently than others.) The data stream could follow a sequence, such as Time 1, X, Y, Z, Angle 1, Angle 2, Angle 3; Time 2, X, Y, Z, Angle 1, Angle 2, Angle 3; Time 3 and so on.

As for coordinates and angles, time may be specified in different ways. In general, the unit of time may be seconds (with minutes, hours, days and so on being variations on seconds). Time may be specified as the period after an arbitrary instant. For instance, one may say that the time is 32.5 seconds after the start (at which time was arbitrarily set to zero). Alternatively, there is an international standard for time known as "Universal Time" (UT) in which time runs continuously at a constant speed and is specified in terms of date, hour, minutes and seconds. Universal Time is an international convention and is the same throughout the world. Thus, taking the example above, 32.5 seconds after the start of an event may also be, for example, March 14 at 16:08:45.312 (hours, minutes, and seconds).

In general, the simulations may be performed in arbitrary time with no anchor in Universal Time. However simulations could take place in UT, so that the simulation records the actual UT in the control script. Alternatively, simulations could take place in simulated UT so that the simulation takes place in the future (with a simulated UT after the simulation takes place) or in the past (with a simulated UT from before the simulation).

If the control script records the simulation in actual UT, it is impossible to replay this simulation accurately with respect to time because the true UT time has passed before the script can be replayed. The same problem occurs for simulations that take place in the past.

This is not true, however for simulations recorded in UT from the future. For instance, it is possible to record a simulation on a Tuesday with a UT from the next day (Wednesday) at the same time of day. This simulation could be played back in a real flight on Wednesday with a true UT time. This would give exactly one day to prepare the script and the actual airplane. One could say that the delay between the simulation and the actual operation is exactly one day.

The delay between the simulation and actual flight can be any positive value (positive having a real flight occurring after the simulation). The minimum value is limited by technical considerations that determine how long it takes to prepare, relay and process the script. The maximum value may be unlimited. It may be that the time delay between simulation and the actual flight is less than the duration of the flight. This implies that the replay of the simulation by the real flight begins before the simulation is complete. At the minimum delay limit, the simulation script flies the airplane immediately after the simulation. This may be referred to as almost "real time" and could be perceived by the pilot or operator as direct operation of the airplane if the total delay is substantially short. In such an operation, the simulation quickly creates the control script as described above. The script is immediately relayed to the aircraft 202. The aircraft 202 processes the script, compares the specified coordinates and angles with its measured coordinates and angles, and makes control inputs to minimize any difference.

Alternatively, there may be reason to increase the delay between simulation and the actual flight. In this case, the simulation creates a script as described above, just the same as before when the delay is minimized. In this case however the script is stored in order in a buffer of some sort, such as buffer 244. The buffer 244 may be for instance a memory chip, disk drive or magnetic tape. This stream of data could then be played back in order and relayed to the aircraft 202 after the desired delay period.

The buffer 244 permits a portion of the script to be re-done provided the simulation is being performed sufficiently in advance of the actual flight or operation. For example, the simulation 222 may be controlling operation of the aircraft 202 with a certain time delay. For the purpose of this example, assume that the delay is 100 seconds. In this case, the buffer 244 is being "read" 100 seconds after the "write" occurs via the simulation script input. It may be that the simulator pilot or operator 234 makes and quickly recognizes an error that he wishes to "undo". He may execute a "re-do" option by pushing a button or by other means. This action will instantly jump the simulation 222 back in time to a predetermined or selected time increment, for example, 20 seconds. The action will also instantly begin to overwrite the prior 20 seconds of data in the buffer 244 and will change the buffer delay to 80 seconds. The effect of this is to eliminate the 20 seconds of erroneous input; replace the erroneous input with a "re-do" input; and reduce the delay to 80 seconds.

As previously discussed, the system 200 may perform calculations associated with the simulation 222 according to an increment of time. An initial condition may be specified including coordinates, angles, thrust, control surface positions, airspeed and direction. From these conditions the simulator or system 200 may calculate the device's or airplane's linear and angular accelerations. These values may be used to calculate a new set of conditions based on the time increment and display the position of the representation 221 of the airplane in the simulation 222. The system 200 typically performs the calculations and displays the aircraft 202 in its new position such that the time increment used in the calculation is the same length as the actual time taken to perform the calculation. In this way, the simulation 222 may proceed at substantially the true speed—not slow motion or fast motion. The computer or processor may be able to perform the calculations in much less time than the specified time increment. In this case at least two methods can be used to maintain true speed. A "pause" can be inserted in the routine between each cycle of calculations so that the simulation remains synchronized with true time. Alternatively, the time increment used in the calculations can be decreased so that the computer's calculation time is equal to the time increment. Generally, it is desirable to have more computation steps because this provides a slightly more accurate calculation of the simulation's physics (ideally the time increment would be vanishingly small). Also, if the time increment is too long the simulation display can become "notchy" because the frame rate is too low—instead of the smooth motion picture effect the individual frames become noticeable and distracting. The presentation of the simulation 222 in true time is generally desirable but there may be instances in which it may be desirable to speed up or slow down the simulation with respect to true time.

The simulation 222 may be slowed down by at least two means, similar to that described briefly above. First, a variable length pause can be inserted between each calculation cycle. The length of this pause can be used to control the speed of the simulation 222 where a longer pause provides a slower simulation with respect to true time. This method, when carried too far, may result in a simulation that is no longer smooth—the actual frames may be visible and move without smoothness as noted above. A second method is to reduce the time increment on which the simulation calculations are done. This will also reduce the speed of the simulation 222. These two methods can also be combined.

The simulation 222 may also be sped up. If a pause is used between calculation cycles, this pause can be reduced. Alternatively, the time increment used in the calculation cycle can be increased. This method has the effect of magnifying generally small errors in the calculation that arise from the finite length of the time increment. When carried to extremes, this method may provide inaccurate simulations.

Even though the simulation 222 may be run at a non-true speed, the script from the simulation 222 can still output coordinates, angles, etc. on the basis of true time. This will have an influence on the buffer status however. If the simulation 222 is run at faster than true speed, more data will be written to the buffer 244 than is being read since the buffer 244 is being read at true speed. This means that the time delay increases. If the simulation 222 is run at slower than true speed, less data will be written to the buffer 244 than is being read. This means that the time delay decreases.

The ability to speed up the simulation 222 may be desirable for many reasons. One exemplary reason may be to enable rapid flight programming in a context for which relatively few control inputs are required and for which these inputs need not be particularly precise. Thus, the simulation pilot or operator 234 can quickly perform a flight that in real time (and in execution) would take much longer. Note that even if the real flight starts shortly after the simulation 222, there will be a long time delay at the end of the flight since the operator 234 will have finished the simulation 222 well before the airplane 202 finishes the flight. This implies a large buffer capacity.

Another reason to speed up a simulation 222 may be to reestablish the desired buffer delay or time delay following a re-do as previously described.

The ability to slow down the simulation 222 may also be desirable. One exemplary reason to provide a slow-motion simulation may be to allow the operator 234 to make very carefully measured control inputs for challenging maneuvers. Or, the simulation 222 may be slowed to allow the operator 234 to consider many options or mission features in a less hurried way. Slow motion reduces the buffer delay so the duration of slow motion simulation is limited by the initial delay. If the delay is already minimized, slow motion is not possible. The script must always be ahead of the actual flight.

A continuous data stream script should be provided to the aircraft 202. Long periods of time should not be skipped because the airplane's control system depends on frequent position specification updates. For this reason, simulation re-do's in which the simulation jumps back in time must synchronize the re-do script with the prior script so that there is no discontinuity in the time sequence or in the position specification. Notably, this means that the simulation 222 cannot be jumped forward in time. This would leave a gap in the time and position increment that would essentially leave the airplane 202 without instructions. Further, this means that catching up the buffer delay from a do-over must be done by an increase in the simulation speed and not by a simple jump forward. Note that the change in simulation speed may vary sharply, i.e., the simulation speed does not necessary need to be varied smoothly.

When actually flying, a pilot relies on feedback from the airplane to modulate the controls. Many manned airplanes provide a direct linkage between the controls and the flight control surfaces so that the control surfaces respond immediately to control input. Furthermore, most airplanes respond immediately and predictably to control surface deflection. A time delay between control input and the response of the airplane can be confusing to the pilot. Delays often lead to "Pilot Induced Oscillations" (PIO) or what may be commonly referred now as "pilot-in-the-loop oscillations". In such an oscillation, the pilot puts in a certain control deflection. Nothing happens so he puts in more control. Then too much happens so he puts in the opposite control. Basically, the pilot and airplane chase each other and the airplane oscillates. This is very undesirable. Such delays have been an issue for recent airplanes that use flight control computers to mediate between the pilot's controls and the flight control surfaces. Some of these systems introduce a time delay sufficient to cause PIOs in some situations. It turns out that time delays are most critical in high-precision maneuvers, and it is these maneuvers that can least afford oscillations.

Research has shown that PIOs can be avoided in computer-mediated airplanes and unmanned airplanes by keeping the delay between control input and perceived response to less than about 0.100 seconds.

Some unmanned systems may be flown from distant locations with numerous mediating computer systems in the loop. This can result in unacceptably long control delays. This effectively limits pilot or operator input of unmanned systems to general guidance. That is, the airplane flies itself with a large degree of autonomy.

The embodiment of the present invention described with respect to the feature of recording a script created from a simulation reduces the latency perceived by the simulation pilot or operator. The system 200 also enables the operator to fly an unmanned system much more directly so that the airplane itself does not need such a high degree of autonomy. This can facilitate much more complex and dynamic missions. "Dynamic" in this context means a mission in which many factors are uncertain or in which many factors are in flux with respect to time or space.

In accordance with another embodiment of the present invention, the operator and control system could be located within the system as a whole. There may be some systems, factories, vehicles or the like were this may be advantageous. One example may be a very large vehicle system, such as a ship or other system. Ships typically have very slow response times and it is possible to make an irrevocable error minutes before the consequences are recognized and minutes more before the actual undesirable or unwanted event may occur. Operating such a ship in the simulation mode with a long lead time could allow the consequences to be recognized before an action is actually performed or performance is started. Under such a scenario, the re-do feature of the present invention may be executed.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to control a device, comprising:
   forming an integrated simulation model of an actual environment in which the device is or will be operating, wherein the integrated simulation model is formed using pre-existing data and real-time data related to the actual environment, the pre-existing data comprising at least one of imagery of the actual environment, terrain contours, weather predictions, descriptions and locations of any points of interest, and locations and descriptions of any threats or hazards to the device in the actual environment, and wherein the pre-existing data is obtained from at least one of a satellite, aerial reconnaissance, ground reconnaissance and a sensor;

presenting a simulation including a representation of the device operable in the integrated simulation model of the actual environment;

allowing control of the simulation of the representation of the device in the integrated simulation model of the actual environment; and controlling operation of the device in the actual environment using the simulation of the device in the integrated simulation model of the actual environment.

2. The method of claim 1, further comprising allowing control of operation of the representation of the device to perform a simulated function in the integrated simulation model of the actual environment a predetermined time period before the device in the actual environment performs an actual function corresponding to the simulated function previously performed in the integrated simulation model.

3. The method of claim 2, further comprising allowing adjustment of the predetermined time period by permitting speeding up and slowing down of the simulation of the device in the integrated simulation model of the actual environment.

4. The method of claim 2, further comprising allowing a selected portion of the simulation to be re-done in response to the predetermined time period being sufficiently long to permit the selected portion to be re-done and transferred to the device in the actual environment before performance of any functions corresponding to the selected portion of the simulation to be re-done.

5. The method of claim 2, further comprising:
allowing the simulation to be slowed-down to provide additional time for adjustments and control of the representation of the device within the simulation and decision making; and
allowing the simulation to be speed-up to increase the predetermined time period.

6. The method of claim 1, further comprising:
permitting operation of the simulation of the device in the integrated simulation model of the actual environment with altered performance characteristics compared to the device in the actual environment; and
compensating for any operating limitations of the device in the actual environment.

7. The method of claim 1, allowing selection of a viewpoint from which the simulation of the device in the integrated simulation model of the actual environment may be viewed and controlled.

8. The method of claim 1, further comprising:
creating a control script from the simulation of the device in the integrated simulation model of the actual environment; and
transferring the control script to the device in the actual environment to control operation of the device.

9. The method of claim 1, wherein the device comprises one of an aerospace vehicle, a terrestrial vehicle, a watercraft and a machine.

10. A method to control a device, comprising:
obtaining pre-existing data related to an actual environment in which the device is or will be operating to create a simulation of the actual environment;
generating a first virtual model of the actual environment based on the pre-existing data;
obtaining real-time data related to the actual environment in which the device is or will be operating;
generating a second virtual model of the actual environment based on the real-time data;
merging the first virtual model and the second virtual model to form an integrated simulation model of the actual environment in which the device is or will be operating;
presenting a simulation including a representation of the device operable in the integrated simulation model of the actual environment to permit control of operation of the representation of the device in the integrated simulation model of the actual environment;
allowing control of operation of the representation of the device in the integrated simulation model of the actual environment;
creating a control script from operation of the simulation of the device in the integrated simulation model of the actual environment; and
transferring the control script to the device operating in the actual environment to control operation of the device in the actual environment based on the control script.

11. The method of claim 10, further comprising creating the control script a predetermined time period before the device is required to perform a function in the actual environment using the control script.

12. The method of claim 11, further comprising allowing adjustment of the predetermined time period by permitting speeding up and slowing down of the simulation of the device in the integrated simulation model of the actual environment.

13. The method of claim 10, further comprising:
continuously creating the control script while controlling operation of the simulation of the device in the integrated simulation model of the actual environment; and
streaming the control script to the device in the actual environment.

14. The method of claim 10, further comprising allowing control of operation of the simulation of the device in the integrated simulation model of the actual environment a predetermined time period before operation of the device in the actual environment corresponding to the operation of the device in the simulation.

15. The method of claim 10, further comprising providing a re-do feature to re-do a portion of the simulation of the device operating in the integrated simulation model of the actual environment.

16. The method of claim 10, further comprising providing a feature to control a speed of operation of the simulation of the device in the integrated simulation model of the actual environment.

17. The method of claim 10, further comprising compensating for any operating limitations of the device in the actual environment.

18. The method of claim 10, further comprising:
permitting operation of the simulation of the device in the integrated simulation model of the actual environment with altered performance characteristics compared to the device in the actual environment; and
compensating for any operating limitations of the device in the actual environment in the control script.

19. The method of claim 10, wherein obtaining pre-existing data related to the actual environment comprises at least one of:
obtaining terrain contours of the actual environment;
obtaining images of the actual environment from a satellite;
obtaining weather predictions;

obtaining threat information; and
obtaining target information.

20. The method of claim 10, wherein obtaining real-time data related to the actual environment comprises at least one of:
   obtaining real-time images and information from a satellite;
   obtaining real-time images and information from the device;
   obtaining real-time images and information from other devices; and
   obtaining real-time images and information from fixed locations within the environment.

21. A method to remotely control operation of a vehicle, comprising:
   forming an integrated simulation model of an actual environment in which the vehicle is or will be operating, wherein the integrated simulation model is formed using pre-existing data and real-time data related to the actual environment, the pre-existing data comprising at least one of imagery of the actual environment, terrain contours, weather predictions, descriptions and locations of any points of interest, and locations and descriptions of any threats or hazards to the device in the actual environment, and wherein the pre-existing data is obtained from at least one of a satellite, aerial reconnaissance, ground reconnaissance and a sensor;
   presenting a simulation including a representation of the vehicle operable in the integrated simulation model of the actual environment;
   allowing control of operation of the representation of the vehicle in the integrated simulation model of the actual environment;
   controlling operation of the vehicle in the actual environment using the simulation of the vehicle in the integrated simulation model of the actual environment; and
   allowing the simulation of the vehicle in the integrated simulation model of the actual environment to be run a predetermined time period before the vehicle in the actual environment to substantially avoid latency and to permit correction of any mistakes.

22. The method of claim 21, further comprising:
   allowing the simulation to be slowed-down to provide additional time for maneuvering and more precise operation of the representation of the vehicle within the simulation; and
   allowing the simulation to be sped-up to increase the predetermined time period.

23. The method of claim 21, further comprising:
   permitting operation of the representation of the vehicle in the integrated simulation model of the actual environment with altered performance characteristics compared to the vehicle in the actual environment; and
   compensating for any operating limitations of the vehicle in the actual environment.

24. The method of claim 21, further comprising allowing selection of a viewpoint from which the simulation of the vehicle in the integrated simulation model of the actual environment may be viewed and controlled.

25. The method of claim 24, wherein allowing selection of the viewpoint comprises at least one of:
   providing a viewpoint from within the representation of the vehicle in the simulation;
   providing a viewpoint outside of the representation of the vehicle in the simulation; and
   providing a viewpoint including instrumentation associated with the vehicle.

26. The method of claim 21, wherein controlling operation of the vehicle comprises controlling operation of one of an aerospace vehicle, a terrestrial vehicle, a planetary rover, and a watercraft.

27. A system to control a device, comprising:
   a processor to form an integrated simulation model of an actual environment in which the device is or will be operating, wherein the integrated simulation model is formed using pre-existing data and real-time data related to the actual environment, the pre-existing data comprising at least one of imagery of the actual environment, terrain contours, weather predictions, descriptions and locations of any points of interest, and locations and descriptions of any threats or hazards to the device in the actual environment, and wherein the pre-existing data is obtained from at least one of a satellite, aerial reconnaissance, ground reconnaissance and a sensor;
   a display to present a simulation including a representation of the device operable in the integrated simulation model of the actual environment;
   a control interface to allow control of operation of the simulation of the device in the integrated simulation model of the actual environment; and
   a transceiver to transmit a control script to the device in the actual environment to control operation of the device in the actual environment using the simulation of the representation of the device in the integrated simulation model.

28. The system of claim 27, further comprising an image processor to generate an image of the actual environment using the pre-existing data and real-time data related to the actual environment.

29. The system of claim 28, wherein the image processor comprises:
   a geometric transformation module to transform data related to the actual environment received from at least one of the device being controlled, the satellite, a fixed location within the actual environment and other devices for use in forming the integrated simulation model of the actual environment;
   an overlay control module to properly align different virtual models of the actual environment generated from the pre-existing data and real-time data related to the actual environment to form the integrated simulation model of the actual environment;
   a symbology module to assign symbols to represent different landmarks or features in the actual environment in the integrated simulation model; and
   a tracking control module to track any movement of the device in the actual environment.

30. The system of claim 28, further comprising an environmental simulation module associated with the image processor to form the integrated simulation model of the actual environment for presentation on the display.

31. The system of claim 30, wherein the environmental simulation module comprises:
   a geography database to store any pre-existing geographical data related to the actual environment;
   a threat and target database to store any pre-existing data related to any potential threats to the device within the actual environment and to store any pre-existing data related to any target within the actual environment; and
   a imagery database to store any pre-existing data of any images related to the actual environment.

32. The system of claim 27, wherein the control interface comprises:
   a control to control movement of the device;

a control to control a speed of the simulation; and a control to control a predetermined time delay between the simulation and operation of the device in the actual environment.

33. The system of claim 27, further comprising a device simulation module to control operational characteristics of the representation of the device in the simulation and to compensate for any operating limitations of the device in the actual environment.

34. The system of claim 27, further comprising a device control and systems processor to generate the control script based on the simulation.

35. The system of claim 27, further comprising a buffer to buffer the control script before being transmitted to the device in the actual environment.

36. A computer program product to control a device, the computer program product comprising:

a computer usable medium having computer usable program code embodied therewith, the computer usable medium comprising:

computer usable program code configured to form an integrated simulation model of an actual environment in which the device is or will be operating, wherein the integrated simulation model is formed using pre-existing data and real-time data related to the actual environment, the pre-existing data comprising at least one of imagery of the actual environment, terrain contours, weather predictions, descriptions and locations of any points of interest, and locations and descriptions of any threats or hazards to the device in the actual environment, and wherein the pre-existing data is obtained from at least one of a satellite, aerial reconnaissance, ground reconnaissance and a sensor;

computer usable program code configured to present a simulation including a representation of the device operable in the integrated simulation model of the actual environment;

computer usable program code configured to allow control of operation of the simulation of the representation of the device in the integrated simulation model of the actual environment; and computer usable program code configured to control operation of the device in the actual environment using the simulation of the representation of the device in the integrated simulation model of the actual environment.

37. The computer program product of claim 36, further comprising computer usable program code configured to allow control of operation of the simulation of the device to perform a simulated function in the integrated simulation model of the actual environment a predetermined time period before the device in the actual environment performs an actual function corresponding to the simulated function previously performed in the integrated simulation model.

38. The computer program product of claim 37, further comprising computer usable program code configured to allow a selected portion of the simulation to be re-done in response to the predetermined time period being sufficiently long to permit the selected portion to be re-done and transferred to the device in the actual environment before performance of any functions corresponding to the selected portion of the simulation to be re-done.

39. The computer program product of claim 37, further comprising:

computer usable program code configured to allow the simulation to be slowed-down to provide additional time for adjustments and control of the representation of the device within the simulation and additional time for decision making; and computer usable program code configured to allow the simulation to be speed-up to increase the predetermined time period.

40. The computer program product of claim 37, further comprising:

computer usable program code configured to permit operation of the representation of the device in the integrated simulation model of the actual environment with altered performance characteristics compared to the device in the actual environment; and computer usable program code configured to compensate for any operating limitations of the device in the actual environment.

* * * * *